May 11, 1965

C. D. ROACH 3,182,741

ON-ROAD, OFF-ROAD TRACK CARRYING VEHICLE

Filed Feb. 26, 1964

INVENTOR.
CHARLES D. ROACH
BY Harry M. Saragovitz
Edward J. Kelly, Herbert Berl,
& James W. Colvin
ATTORNEYS May 11, 1965     C. D. ROACH     3,182,741

ON-ROAD, OFF-ROAD TRACK CARRYING VEHICLE

Filed Feb. 26, 1964     2 Sheets-Sheet 2

INVENTOR.
CHARLES D. ROACH
BY Harry M. Saragovitz,
Edward J. Kelly, Herbert Berl,
& James W. Colvin
ATTORNEYS

United States Patent Office 3,182,741
Patented May 11, 1965

3,182,741
ON-ROAD, OFF-ROAD TRACK CARRYING VEHICLE
Charles D. Roach, Newport News, Va., assignor to the United States of America as represented by the Secretary of the Army
Filed Feb. 26, 1964, Ser. No. 347,624
6 Claims. (Cl. 180—9.5)
(Granted under Title 35, U.S. Code (1952), sec. 266)

The invention described herein may be manufactured and used by or for the Government for governmental purposes without the payment to me of any royalty thereon.

This invention relates to track carrying vehicles and more particularly to a vehicle having tracks the configuration of which can be changed to adapt the vehicle to either on-road or off-road operation. While the vehicle may be of any type or for any compatible use, the invention is particularly applicable to military vehicles such as troop carriers, weapon carriers, ambulances, etc.

It is among the objects of the invention to provide an improved track supported vehicle wherein the shape of the tracks can be changed without interrupting the operation thereof to adapt the vehicle to highway travel or to off-road travel, particularly over swampy or sandy terrain.

It is a further object of the invention to provide an improved track supported vehicle wherein the shape of the tracks can be changed from a configuration in which the upper and lower flights of each track are substantially parallel to each other and to the longitudinal center line of the vehicle to a configuration in which the upper and lower flights diverge rearwardly from the front of the track the lower flight, in particular, being inclined rearwardly and downwardly.

It is a still further object of the invention to provide track assemblies for a track supported vehicle wherein each track assembly includes hydraulically actuated mechanism effective to change the shape of the track from a substantially rectangular to a substantially triangular shape.

Other objects and advantages will become apparent from a consideration of the following description and the appended claims in conjunction with the accompanying drawings wherein:

Figure 1:
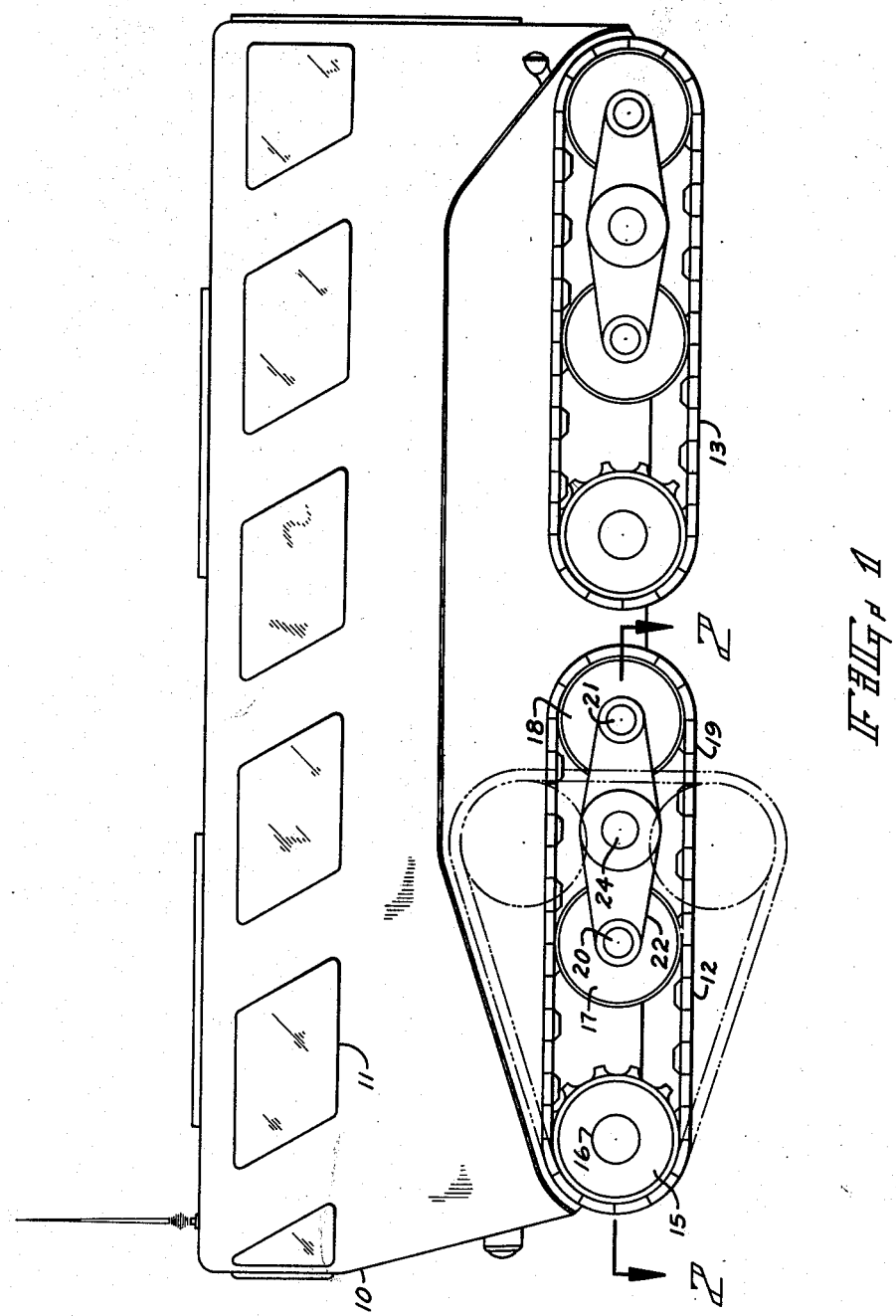
FIG. 1 is a side elevational view of a track supported vehicle having convertible tracks constructed in accordance with the present invention.
Figure 2:
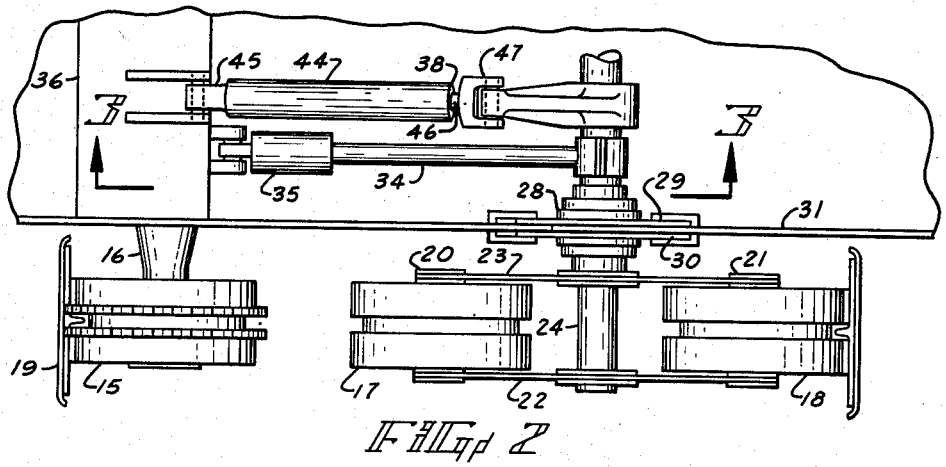
FIG. 2 is a fragmentary cross-sectional view substantially on a plane indicated by the line 2—2 on FIG. 1.

With continued reference to the drawings the vehicle shown in FIG. 1 is a track supported vehicle, such as a troop carrier, and comprises a body and frame assembly 10, illustrated as having windows 11 in its upper portion. The body is supported on four track assemblies, the left hand two of which are illustrated in FIG. 1 and indicated at 12 and 13. As the track assemblies are identical in construction and operation a detailed description of one only is considered sufficient for the purposes of this disclosure and the assembly 12 has been selected for detailed description. This track assembly comprises a track sprocket 15 disposed at the forward end of the track assembly and mounted on a drive axle 16. The axle 16 is driven from a suitable powerplant disposed within the vehicle body 10 and acting through suitable transmission and differential gearing, not illustrated. The assembly further includes a pair of track rollers or wheels 17 and 18 disposed in tandem or generally horizontal alignment rearwardly of the sprocket when the track assembly is in its on-road or highway operating condition, as illustrated in full lines in FIG. 1. An endless flexible track 19 extends around the sprocket 15 and the rollers 17 and 18 and is maintained under proper tension by suitable means to be presently described.

The rollers 17 and 18 are mounted on corresponding stub axles 20 and 21 and these stub axles are mounted at their opposite ends in the opposite end portions of spaced apart arms or levers 22 and 23 which levers are mounted at their mid-length locations on an axle 24 which extends outwardly from the vehicle body between the rollers 17 and 18.

The axle 24 is journalled near one end in a bearing 28 carried by a pair of plates 29 and 30 slidably mounted in an opening in the left hand side member 31 of the vehicle frame. At its other end the axle is journalled in a similar bearing mounted in suitable slide plates, not illustrated. A hydraulic device including a piston rod 34 and a cylinder 35 is connected between the axle 24 and a front cross member 36 of the vehicle frame and resiliently urges the axle 24 rearwardly to maintain the proper tension on the track 19. This hydraulic device permits the axle 24 to move forward a slight amount when the track assembly is changed from its on-road to its off-road condition to accommodate the assembly to the constant length of the track as the shape of the assembly is changed.

Figure 3:
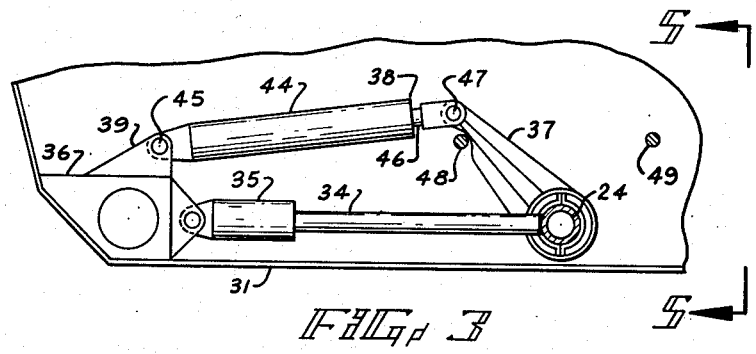
FIG. 3 is a fragmentary cross-sectional view substantially on a plane indicated by the line 3—3 on FIG. 2.

A lever 37 is secured at one end to the axle 24 inwardly of the hydraulic mechanism including the rod 34 and cylinder 35 and extends upwardly and forwardly from the axle at an angle of approximately 45 degrees to the vertical when the track assembly is in its on-road condition, as illustrated in FIG. 3. In the on-road condition of the track assembly the rollers 17 and 18 are in tandem and substantially in horizontal alignment with each other and with the track sprocket 15 and the upper and lower flights of the track are substantially parallel to each other and to the longitudinal center line of the vehicle so that the track has a generally rectangular shape except that the ends of the rectangle are convex as they pass around the sprocket 15 and roller 18. A hydraulic device 38 is connected between the distal end of the lever 37 and a bracket 39 mounted on the frame cross member 36. The hydraulic device 38 comprises a cylinder 44 connected at one end to the bracket 39 by a pivotal connection 45 a piston, not illustrated, and a piston rod 46 connected to the distal end of the lever 37 by a pivotal connection 47.

Figure 4:
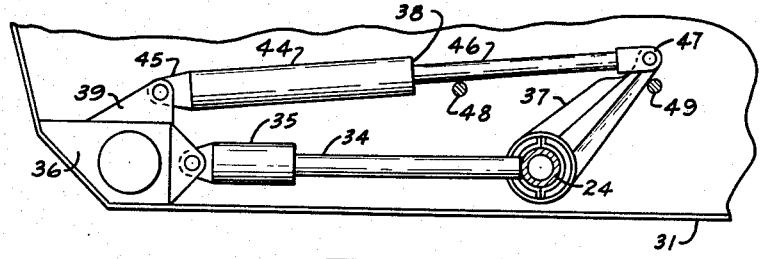
FIG. 4 is a view similar to FIG. 3 but showing the parts in a different operative position from that shown in FIG. 3.
Figure 5:
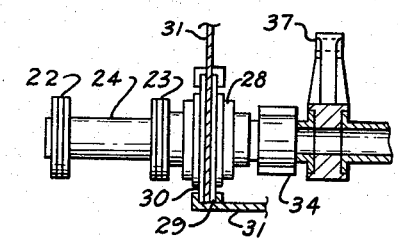
FIG. 5 is a fragmentary cross sectional view substantially on a plane indicated by the line 5—5 of FIG. 3.

When the lever 37 is in its forwardly inclined position as limited by the stop pin 48, the track assembly is in its on-road or highway operating condition, as explained above. When the hydraulic mechanism 38 is expanded from its contracted condition, as illustrated in FIG. 3, to its expanded condition illustrated in FIG. 4, the lever 37 is moved to its upwardly and rearwardly inclined position as limited by the stop pin 49. The movement of the lever 37 through an angle of approximately 90 degrees from its 45 degree forwardly inclined position to its 45 degree rearwardly inclined position turns the axle 24 and the levers or arms 22 and 23 through an angle of approximately 90 degrees so that the arms are now substantially vertically rather than substantially horizontally disposed. The rollers 17 and 18 are now disposed one above the other in generally vertical alignment and the track assembly has assumed the generally triangular shape illustrated in broken lines in FIG. 1. Under these conditions the upper and lower flights of the track diverge from the track sprocket 15 at the front of the track assembly, the upper flight being rearwardly and upwardly inclined and the lower flight being rearwardly and downwardly inclined. This inclination of the lower flight of the track enables the track to apply a lifting force as well as a forwardly propelling force to the corresponding corner of the vehicle and thus enables the vehicle to transverse swampy or sandy terrain without difficulty.

Since the track is driven by the track sprocket 15 which does not change its position and since proper tension is maintained on the track as the position of the rollers 17 and 18 is changed between their horizontally aligned and vertically aligned postions, the track may be changed from its on-road or highway condition to its off-road or rough terrain condition or vice-versa without interrupting the driving of the track by the associated power plant. Operation of the hydraulic mechanism 38 in either direction can be controlled by a suitable valve located in the driver's compartment of the vehicle and the operation of the hydraulic mechanism including the piston rod and cylinder 34 and 35 can be controlled by a suitable automatic pressure regulating valve, not illustrated, to maintain the proper tension on the track at all times.

It is preferred that all four tracks of the vehicle change their shape simultaneously but it is within the scope of the invention to provide control means such that the front and rear tracks can change their condition independently. For example, if the vehicle were towing another vehicle the conditions could occur under which it would be desirable to have the rear tracks in their off-road or rough terrain condition while leaving the front tracks in their on-road or highway travel condition.

While a suitable embodiment has been hereinabove described and illustrated in the accompanying drawings for the purpose of fully disclosing the invention, it is to be understood that the scope of the invention is not limited to the particular embodiment so illustrated and described but is commensurate with the scope of the appended claims.

I claim:

1. A vehicle track assembly for a track supported vehicle comprising a sprocket, a pair of rollers disposed rearwardly of said sprocket, a track extending around said sprocket and said rollers, and a mechanism effective to move said rollers between operating positions in one of which they are horizontally aligned and in the other of which they are vertically aligned.

2. A vehicle track assembly for a track supported vehicle comprising a sprocket, a pair of bodily movable rollers disposed rearwardly of said sprocket, a track extending around said sprocket and said rollers, roller supporting means having a center of rotation directly rearwardly of said sprocket and between said rollers and hydraulic mechanism connected between said vehicle and said roller supporting means effective to move said rollers between operative positions in one of which the rollers are disposed one in front of the other and in the other of which the rollers are disposed one above the other.

3. A track assembly for a track supported vehicle comprising a power driven sprocket disposed at the forward end of said assembly, an axle disposed rearwardly of said sprocket, an arm carried by said axle and extending to opposite sides thereof, track rollers carried by said arm at respectively opposite sides of said axle, an endless track extending around said sprocket and said rollers, and power actuated means connected to said axle for turning said axle to move said rollers from one to the other of two operative positions in one of which the rollers are in tandem relationship and in the other of which the rollers are disposed one above the other.

4. A track assembly for a track supported vehicle comprising a power driven track sprocket, an axle disposed rearwardly of said sprocket and having its axis of rotation parallel to the axis of said sprocket, track rollers carried by said axle at respectively opposite sides thereof, an articulated track extending around said sprockets and said said rollers, power actuated means connected to said axle and effective to turn said axle through a limited rotational angle to selectively position said rollers one in front of the other or one above the other.

5. In a track supported vehicle a drive axle extending transversely of said vehicle, track sprockets mounted on said drive axle one near each end thereof, a roller axle disposed rearwardly of and parallel to said drive axle, roller carrying arms mounted on said roller axle and extending to opposite sides thereof, rollers carried by said arms at each of two opposite sides of said axle, an endless track extending around each sprocket and associated rollers, and power actuated mechanism connected to said roller axle for rotating said roller axle and said roller carrying arms through a limited rotational angle to change the position of said rollers between a position in which said rollers are in tandem relationship and a position in which said rollers are in superimposed relationship.

6. In a track supported vehicle, front and rear drive axles extending transversely of said vehicle, track sprockets mounted on said drive axles, front and rear roller axles disposed rearwardly of and parallel to the corresponding drive axles, pairs of rollers carried by said roller axles with the rollers of each pair disposed at respective opposite sides of the corresponding roller axle, an endless track extending around each track sprocket and associated pair of track rollers, and power actuated means connected to said roller axles for rotating said roller axles to change the relative position of the rollers of each pair to convert said tracks between a substantially rectangular shape for on-road use and a substantially triangular shape for off-road use.

References Cited by the Examiner
UNITED STATES PATENTS

| | | | |
|---|---|---|---|
| 2,426,342 | 8/47 | Couse | 305—23 X |
| 2,536,543 | 1/51 | Focht | 305—10 X |
| 3,068,950 | 12/62 | Davidson | 280—5.22 X |

FOREIGN PATENTS 628,190    8/49    Great Britain.

ARTHUR L. LA POINT, *Primary Examiner.*